United States Patent
Komiya et al.

(10) Patent No.: US 10,107,516 B2
(45) Date of Patent: Oct. 23, 2018

(54) REMOTE CONTROLLER, OPERATION SCREEN DISPLAY METHOD, AND PROGRAM

(71) Applicant: Mitsubishi Electric Corporation, Tokyo (JP)

(72) Inventors: Noriyuki Komiya, Tokyo (JP); Takahiro Ito, Tokyo (JP); Tomoaki Gyota, Tokyo (JP); Hiroko Izumihara, Tokyo (JP); Masatoshi Ito, Tokyo (JP); Yuri Nakano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/546,363

(22) PCT Filed: Feb. 24, 2015

(86) PCT No.: PCT/JP2015/055266
§ 371 (c)(1),
(2) Date: Jul. 26, 2017

(87) PCT Pub. No.: WO2016/135863
PCT Pub. Date: Sep. 1, 2016

(65) Prior Publication Data
US 2018/0094828 A1    Apr. 5, 2018

(51) Int. Cl.
| | | |
|---|---|---|
| *G06F 3/041* | (2006.01) | |
| *F24F 11/56* | (2018.01) | |
| *H04Q 9/00* | (2006.01) | |
| *F24F 11/89* | (2018.01) | |
| *G06F 3/048* | (2013.01) | |
| *G06F 3/0484* | (2013.01) | |

(Continued)

(52) U.S. Cl.
CPC .............. *F24F 11/56* (2018.01); *F24F 11/89* (2018.01); *G06F 3/0346* (2013.01); *G06F 3/048* (2013.01);

(Continued)

(58) Field of Classification Search
CPC ...... G06F 3/041; G06F 3/0416; G06F 3/0484; G06F 3/04845; F24F 11/56;

(Continued)

(56) References Cited

U.S. PATENT DOCUMENTS

| | | | | |
|---|---|---|---|---|
| 6,285,357 B1 * | 9/2001 | Kushiro | ................ | G06F 3/0362 345/168 |
| 7,167,122 B2 * | 1/2007 | Stefanik | .................... | 340/12.54 |

(Continued)

FOREIGN PATENT DOCUMENTS

| | | |
|---|---|---|
| CN | 101727176 A | 6/2010 |
| JP | 2003-098908 A | 4/2003 |

(Continued)

OTHER PUBLICATIONS

International Search Report of the International Searching Authority dated May 26, 2015 for the corresponding international application No. PCT/JP2015/055266 (and English translation).

*Primary Examiner* — Joe H Cheng
(74) *Attorney, Agent, or Firm* — Posz Law Group, PLC (57) ABSTRACT

A remote controller includes a user interface, a rotational state detector, and a controller. The rotational state detector detects a rotational state of the remote controller. The controller, based on the rotational state detected by the rotational state detector, selects a display mode from among a plurality of display modes depending on different user tiers. Then the controller causes the user interface to display an operation screen in the selected display mode.

7 Claims, 8 Drawing Sheets

(51) Int. Cl.
*G08C 17/02* (2006.01)
*G06F 3/0346* (2013.01)

(52) U.S. Cl.
CPC ........ *G06F 3/0416* (2013.01); *G06F 3/04845* (2013.01); *G08C 17/02* (2013.01); *H04Q 9/00* (2013.01); *G08C 2201/30* (2013.01); *G08C 2201/32* (2013.01)

(58) Field of Classification Search
CPC ............ H04M 1/72533; H04N 5/4403; H02N 21/42208; H02N 21/4222; H02N 21/42222; H02N 21/42227; H02N 21/43637
See application file for complete search history.

(56) References Cited

U.S. PATENT DOCUMENTS

| | | | | |
|---|---|---|---|---|
| 8,217,825 | B2* | 7/2012 | Kim | ........................ G08C 17/02 341/176 |
| 8,760,522 | B2* | 6/2014 | Henty | ..................... G08C 17/00 348/207.99 |
| 9,525,904 | B2* | 12/2016 | Ryu | ........................ G06F 1/1694 |
| 9,723,350 | B2* | 8/2017 | Kim | ........................ G08C 17/02 |
| 2006/0171734 | A1 | 8/2006 | Maeda | |
| 2008/0130072 | A1 | 6/2008 | Maeda | |
| 2009/0023389 | A1* | 1/2009 | Paryani | .................. H04B 1/202 455/41.2 |
| 2010/0302190 | A1* | 12/2010 | Yeh | ........................ G06F 1/1626 345/173 |
| 2012/0081615 | A1* | 4/2012 | Starr | .................. H04N 21/4222 348/734 |
| 2013/0235427 | A1 | 9/2013 | Maeda | |
| 2014/0160529 | A1 | 6/2014 | Maeda | |

FOREIGN PATENT DOCUMENTS

| | | |
|---|---|---|
| JP | 2003-343902 A | 12/2003 |
| JP | 2006-209011 A | 8/2006 |
| JP | 2006-238391 A | 9/2006 |
| JP | 2007-081904 A | 3/2007 |
| JP | 2014-197267 A | 10/2014 |

\* cited by examiner

| ROTATIONAL ANGLE | DISPLAY MODE |
|---|---|
| 0° | REGULAR MODE |
| 90° | EASY-USE MODE 1 |
| 180° | EASY-USE MODE 2 |

REMOTE CONTROLLER, OPERATION SCREEN DISPLAY METHOD, AND PROGRAM

CROSS REFERENCE TO RELATED APPLICATION

This application is a U.S. national stage application of International Patent Application No. PCT/JP2015/055266 filed on Feb. 24, 2015, the disclosure of which is incorporated herein by reference.

TECHNICAL FIELD

The present disclosure relates to a remote controller for control of a device such as an air conditioner, a lighting device, or the like.

BACKGROUND ART

A remote controller for operation of a device such as an air conditioner, a lighting device, or the like generally uses a liquid crystal display to present to a user a display of information such as a present status of settings. In this case, the size of the displayed information, such as characters and graphics, is normally fixed at a size targeting the user capable of performing general operations without inconvenience, that is to say, is normally fixed at a size such that the displayed information is recognizable by such a user.

However, when the size of the information displayed in this manner is fixed at a size allowing operability by a specific user tier, a problem may occur in that content of the display is difficult to recognize and difficult to use for advanced senior citizens or the like.

In consideration of this problem, Patent Literature 1 discloses a remote controller equipped with a dedicated switch, that is, a magnification switch or display switching switch, for causing magnified display of the content at a size greater than the standard size. Further, Patent Literature 1 discloses a configuration that is not equipped with such a dedicated switch and is capable of magnified display by pressing an operation switch, such as an "operation switching" switch or a "temperature adjustment" switch, continuously for a certain time period.

CITATION LIST

Patent Literature

Patent Literature 1: Unexamined Japanese Patent Application Kokai Publication No. 2003-343902

SUMMARY OF INVENTION

Technical Problem

However, the technology disclosed in Patent Literature 1 requires that the user firstly selects, from among a plurality of arranged switches, the dedicated switch (magnification switch or the like) or the operation switch targeting the magnified display, and thus, such remote controller operations cannot be said to be easy for users such as advanced senior citizens, that is, users having poor vision and users unskillful in remote controller operations.

The present disclosure is developed in order to solve the aforementioned problem, and an objective of the present disclosure is to provide a remote controller and the like capable of causing display of an operation screen in a desired display mode by simple operation by the user.

Solution to Problem

In order to achieve the aforementioned objective, the remote controller according to the present disclosure is a remote controller for controlling at least one device. The remote controller includes:
  a display configured to display an operation screen;
  a rotational state detector configured to detect a rotational state of the remote controller; and
  a display controller configured to select, based on the detected rotational state, a display mode from among a plurality of display modes predetermined depending on different user tiers, and cause the display to display the operation screen in the selected display mode.

Advantageous Effects of Invention

According to the present disclosure, the user can cause display of the operation screen in a desired display mode by rotating the remote controller.

DESCRIPTION OF EMBODIMENTS

Embodiments of the present disclosure are described below in detail in reference to the drawings.

Embodiment 1

Figure 1:
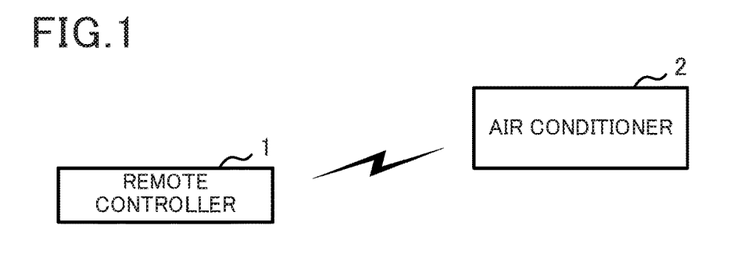
FIG. 1 is a drawing illustrating an air conditioning system including a remote controller according to Embodiment 1 of the present disclosure.

FIG. 1 is a drawing illustrating an air conditioning system including a remote controller according to Embodiment 1.

This air conditioning system includes the remote controller 1 and an air conditioner 2 arranged within an establishment such as a residence of a general household, a building, or the like and adjusting a state of air, that is, temperature, humidity, or the like, on the basis of a control command from the remote controller 1.

Figure 2:
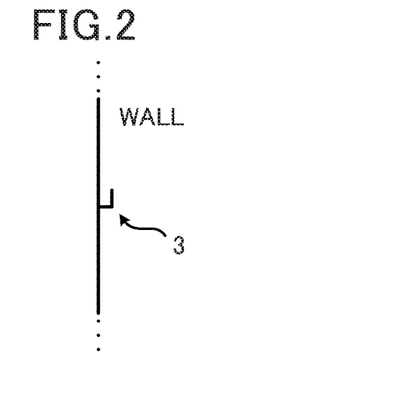
FIG. 2 is a drawing illustrating a hook for attachment of the remote controller of Embodiment 1.
Figure 3:
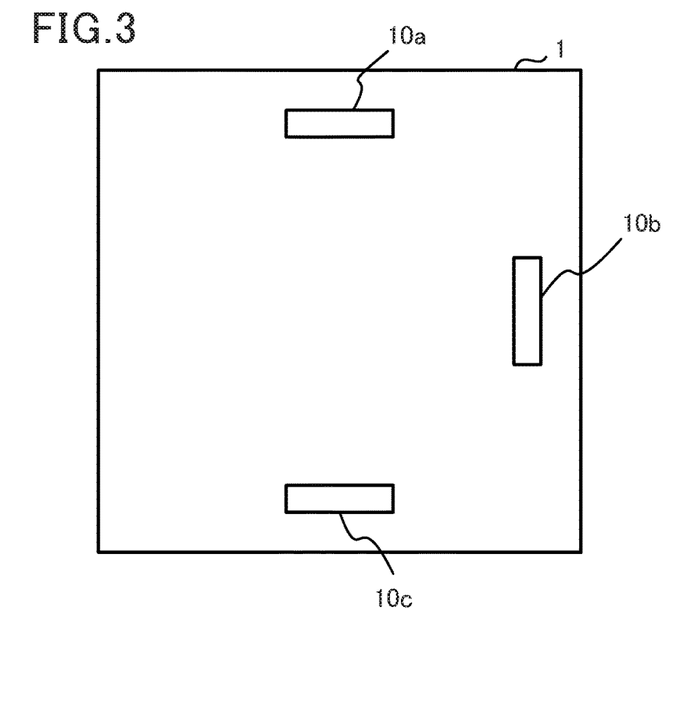
FIG. 3 is a drawing illustrating external appearance (backside) of the remote controller of Embodiment 1.

As illustrated in FIG. 2, the remote controller 1 is made attachable to and is hung from a hook 3 arranged on a wall within the establishment. A backside of the remote controller 1 is rectangular, and as illustrated in FIG. 3, has hook receptacles 10a, 10b, and 10c formed extending along a side (edge) at a top side, right side, and bottom side, respectively.

Figure 4:
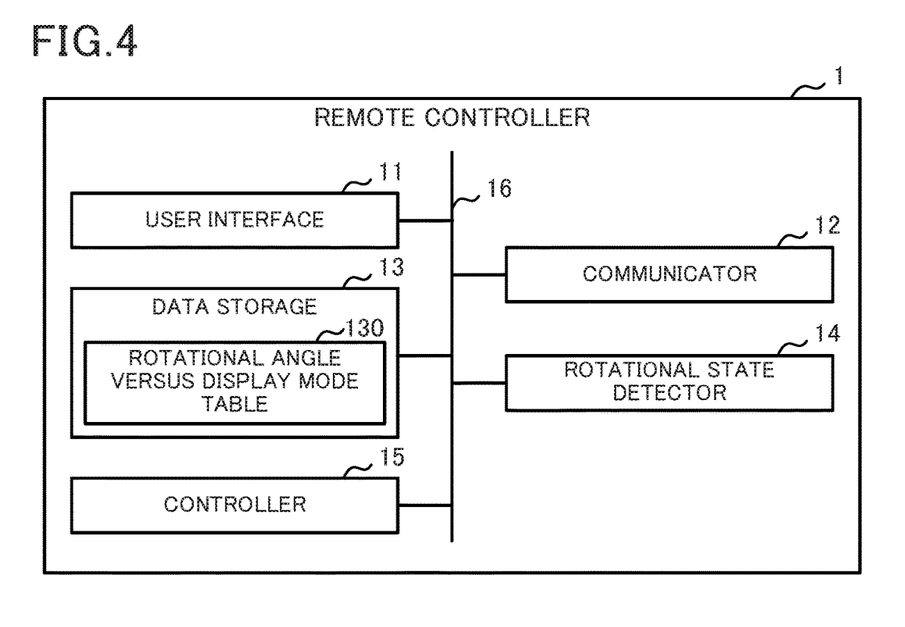
FIG. 4 is a block diagram illustrating a configuration of the remote controller of Embodiment 1.

As illustrated in FIG. 4, the remote controller 1 includes a user interface 11, a communicator 12, a data storage 13, a rotational state detector 14, and a controller 15. These components are interconnected via a bus 16.

Figure 5:
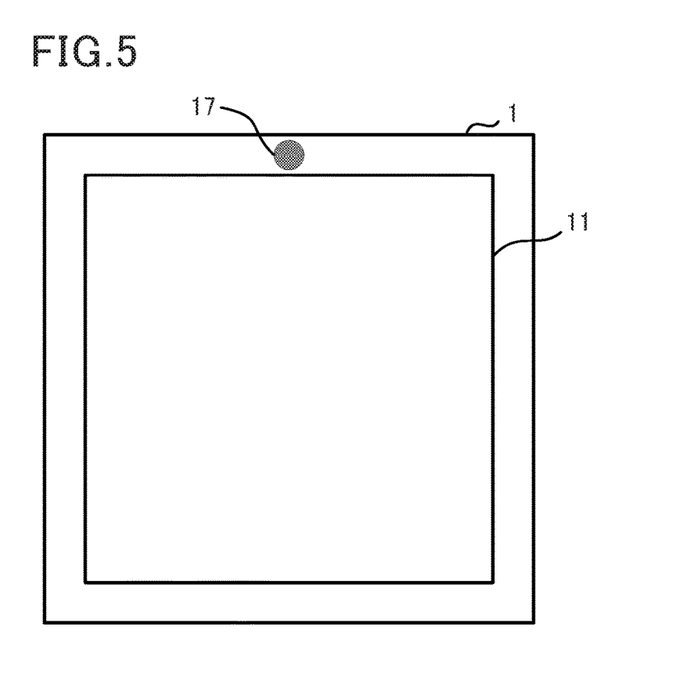
FIG. 5 is a drawing illustrating external appearance (front side) of the remote controller of Embodiment 1.

As illustrated in FIG. 5, the user interface 11 is arranged at a front surface of the remote controller 1, and includes an operation inputter, such as a touch panel or touch pad, and a display such as a liquid crystal display. The user interface 11 displays a screen for user operation (operation screen) or the like in accordance with a command from the controller 15. Further, the user interface 11 receives an input operation from the user and outputs to the controller 15 a signal in accordance with the received input operation.

The communicator 12 includes a predetermined wireless communication interface, and under control of the controller 15, performs data communication with the air conditioner 2 on the basis of a predetermined wireless communication protocol. The data storage 13 may be a readable and writable non-volatile semiconductor memory or the like such as a flash memory, and stores a program (air conditioning control program) for control of the air conditioner 2, a program (display control program) for control of the display of the operation screen, data used during the execution of such programs, or the like. The data storage 13 stores a rotational angle versus display mode table 130 as one set of data used during the execution of the display control program.

The rotational angle versus display mode table 130 is a data table that is referenced when the controller 15 selects the display mode. The association between a rotational angle of the remote controller 1 and a type of the display mode is set in the rotational angle versus display mode table 130. Here, the expression "rotational angle of the remote controller 1" means the rotational angle in the clockwise direction from a predetermined standard position.

The expression "standard position" means the position when a mark 17 on the front surface is positioned at an upper part of the front surface in the state in which the remote controller 1 is attached as illustrated in FIG. 5. In the standard position, the remote controller 1 is attached in a state in which the hook 3 hooks into the hook receptacle 10a.

Figure 6:
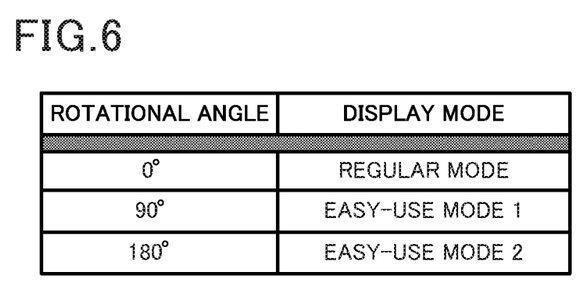
FIG. 6 is a drawing illustrating an example of a rotational angle versus display mode table.

The display modes are predetermined depending on different user tiers, and in the present embodiment, there are three types of display modes, that is, a regular mode, an easy-use mode 1, and an easy-use mode 2. Further, as illustrated in FIG. 6, the rotational angle versus display mode table 130 associates the 0° rotational angle (that is, the standard position) with the regular mode, associates the 90° rotational angle with the easy-use mode 1, and associates the 180° rotational angle with the easy-use mode 2.

That is to say, in the standard position in which the hook 3 is hooked into the hook receptacle 10a, the display mode of the remote controller 1 is the regular mode; and at the position rotated by 90° clockwise from the standard position, that is, at the position in which the hook 3 hooks into the hook receptacle 10b, the display mode is the easy-use mode 1. At the position rotated by 180° clockwise from the standard position, that is, at the position in which the hook 3 hooks into the hook receptacle 10c, the display mode is the easy-use mode 2. Here, the expression "position rotated 90° clockwise from the standard position" has the same meaning as the expression "position rotated 270° counterclockwise from the standard position". In a similar manner, the expression "position rotated 180° clockwise from the standard position" has the same meaning as the expression "position rotated 180° counterclockwise from the standard position".

The rotational state detector 14 detects the rotational state of the remote controller 1 and outputs to the controller 15 a value, that is, a rotational state value, indicating the detected rotational state. In the present embodiment, the rotational state detector 14 is a tilt sensor and detects a tilt by using the aforementioned standard position as a standard reference.

Figure 7:
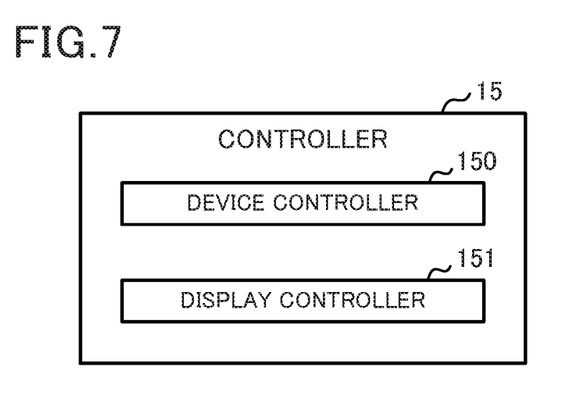
FIG. 7 is a drawing illustrating a functional configuration of a controller included in the remote controller of Embodiment 1.

The controller 15 includes a central processing unit (CPU), a read only memory (ROM), a random access memory (RAM), and the like, all of which are not illustrated, and performs overall controller of the remote controller 1. As illustrated in FIG. 7, the controller 15 includes functions of a device controller 150 and a display controller 151. These component functions are achieved by the CPU executing the air conditioning control program and the display control program, respectively, each of which is stored in the data storage 13.

The device controller 150 executes processing relating to functions of a general remote controller for an air conditioner. That is to say, when the user interface 11 receives a user operation (air conditioning operation) relating to setting of the air conditioning, the device controller 150 controls operation of the air conditioner 2 on the basis of content of the received air conditioning operation.

The display controller 151, on the basis of the rotational state of the remote controller 1, selects one display mode from among the display modes (that is, the regular mode, the easy-use mode 1, and the easy-use mode 2), and causes the display device, such as the liquid crystal display or the like, equipped with the user interface 11 to display the operation screen in the selected display mode. The operation screen includes information relating to air conditioning, such as indoor temperature, and operation buttons, that is, graphical user interface (GUI) buttons.

More specifically, the display controller 151 acquires the rotational state of the remote controller 1 by requesting the detection result from the rotational state detector 14 at certain time intervals. Then the display controller 151 calculates and acquires the rotational angle of the remote controller 1 by a predetermined conversion formula. Here, the display controller 151 may acquire the rotational angle of the remote controller 1 by using a table, which is stored beforehand in ROM or in the data storage 13 and sets correspondence between the rotational angle and the rotational state value from the rotational state detector 14.

Upon acquisition of the rotational angle, the display controller 151 references the rotational angle versus display mode table 130 and selects the display mode corresponding to the acquired rotational angle. Then the display controller 151 causes the display of the user interface 11 to display the operation screen having content that corresponds to the selected display mode.

Figure 8:
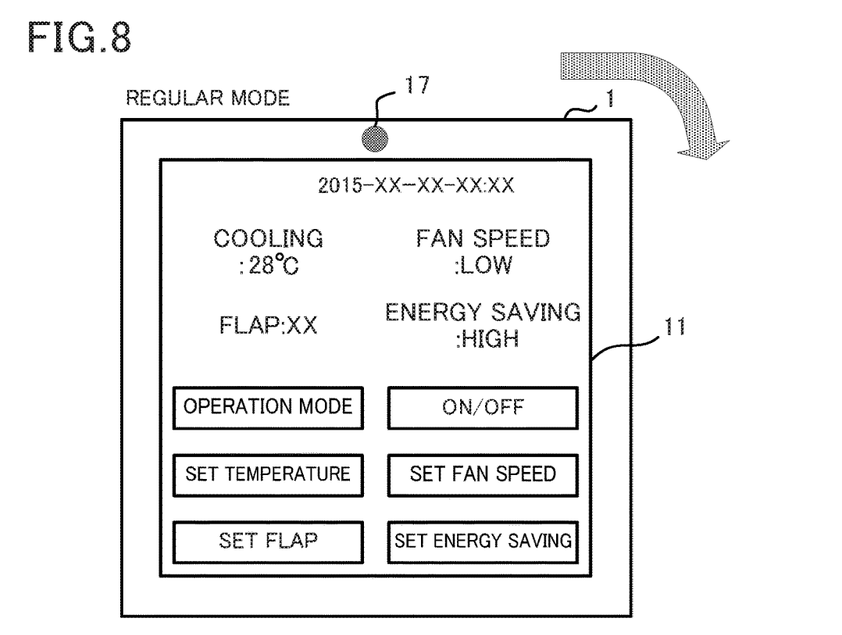
FIG. 8 is a drawing illustrating an example of an operation screen in a regular mode.
Figure 9:
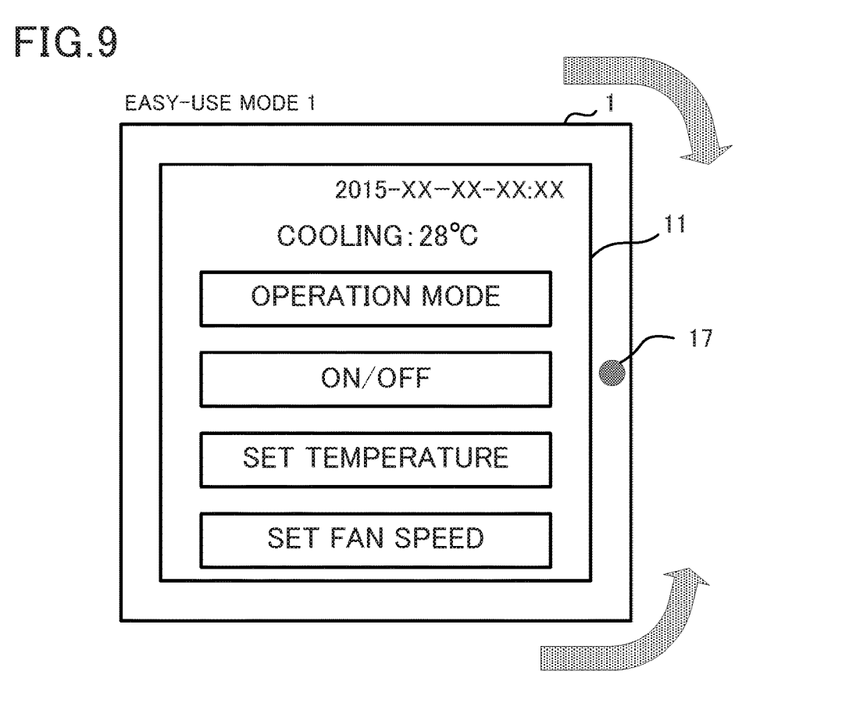
FIG. 9 is drawing illustrating an example of the operation screen in an easy-use mode 1.

Here, the relationship between the display mode and the content of the operation screen is described. When the display mode is the regular mode, the operation screen having content, such as that of FIG. 8, for example, targeting a user tier performing the general operations of this type of remote controller with comfort is displayed. When the display mode is the easy-use mode 1, the operation screen having content targeting a user tier, such as the senior citizens, children, or the like, finding operation somewhat difficult is displayed. As illustrated in FIG. 9, the GUI buttons are displayed at greater size and are more visually recognizable in the easy-use mode 1 in comparison to the regular mode. Further, in order to secure a display region for the larger display size, the displayed GUI buttons are restricted to frequently used buttons, and a portion of the GUI buttons used for performing detailed setting or the like are omitted. Further, although not illustrated, the detection range, that is, tolerance range, of the touch operation by the user for each of the GUI buttons is also increased relative to the regular mode.

Figure 10:
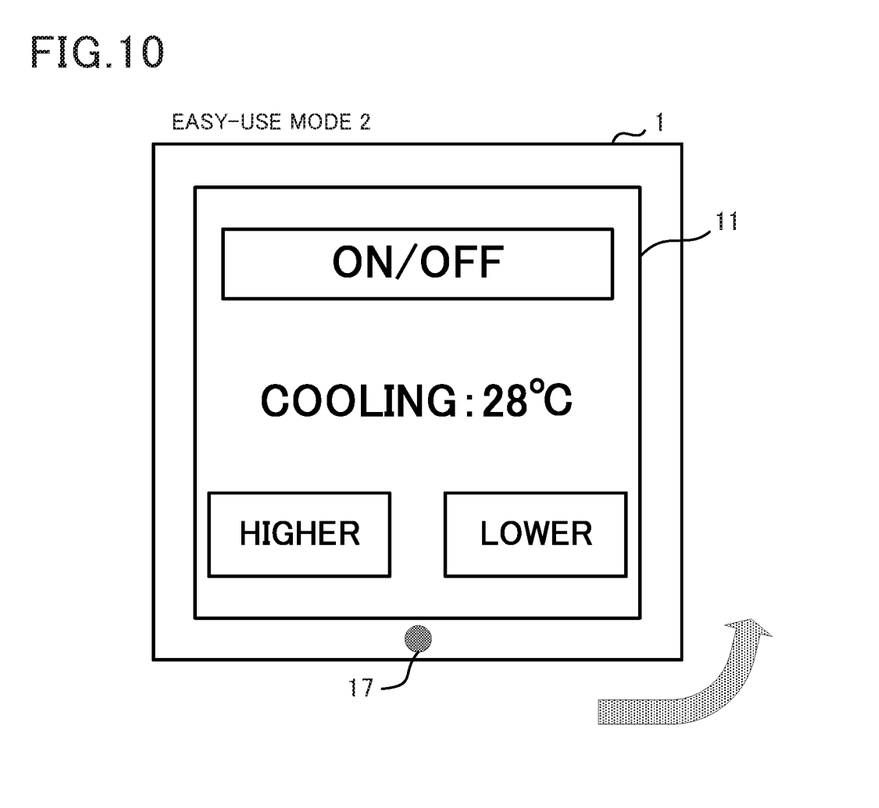
FIG. 10 is drawing illustrating an example of the operation screen in an easy-use mode 2.

When the display mode is the easy-use mode 2, the operation screen having content targeting the user tier of the advanced senior citizens or visually impaired is displayed. As illustrated in FIG. 10, the GUI buttons in the easy-use mode 2 are displayed at a further increased size in comparison to the easy-use mode 1. Further, the detection range of the touch operation by the user for each of the GUI buttons is also increased relative to the easy-use mode 1. Thus in the easy-use mode 2, the displayed GUI buttons are restricted to the buttons used for the minimum required operations.

Figure 11:
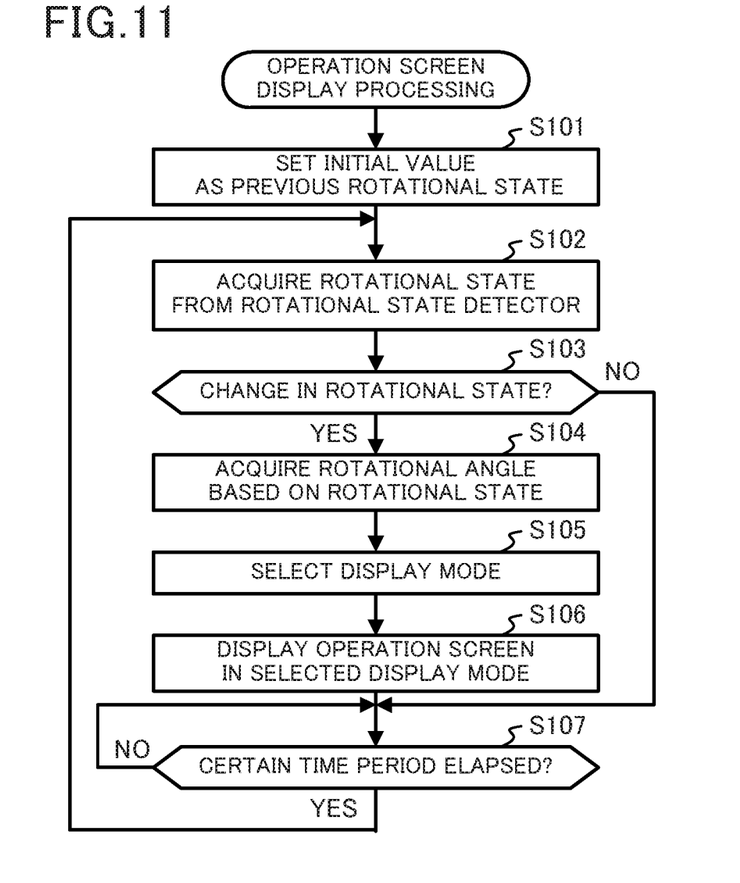
FIG. 11 is a flowchart illustrating a procedure of operation screen display processing executed by the remote controller of Embodiment 1.

FIG. 11 is a flowchart illustrating a procedure of operation screen display processing executed by the controller 15. This operation screen display processing starts when power to the remote controller 1 is turned ON.

The display controller 151 of the controller 15, as the initial setting, sets the initial value as the rotational state value previously detected by the rotational state detector 14 (step S101). Here, the "initial value" is determined beforehand to be a value outside the range of the rotational state value output from the rotational state detector 14.

The display controller 151 acquires the rotational state of the remote controller 1 from the rotational state detector 14 (step S102). Specifically, the display controller 151 requests the detection result from the rotational state detector 14. In response to the request, the rotational state detector 14 outputs to the controller 15 the value, that is, the rotational state value, indicating the detected rotational state.

The display controller 151 compares the previous rotational state value with the presently acquired rotational state value, and determines whether there is a change in the rotational state value (step S103).

When there is no change in the rotational state value (NO in step S103), the display controller 151 delays execution of processing for a certain time period, such as 1 to 2 seconds. Further, upon elapsing of the certain time period (YES in step S107), the display controller 151 again performs the processing of step S102.

On the other hand, when there is a change in the rotational state value (YES in step S103), the display controller 151 acquires the rotational angle of the remote controller 1 in the aforementioned manner (step S104). Further, the display controller 151 refers to the rotational angle versus display mode table 130 and selects the display mode (step S105), and displays the operation screen in the selected display mode (step S106). Thereafter, the display controller 151 delays execution of processing for a certain time period (NO in step S107), and upon elapsing of the certain time period (YES in step S107), again performs the processing of step S102.

In the aforementioned manner, use of the remote controller 1 according to Embodiment 1 of the present disclosure enables the user to switch the display mode simply by the user rotating the entire remote controller 1, without operating a switch, a GUI button, or the like with which the remote controller 1 is equipped. Thus even if the user is an advanced senior citizen or is unskillful in remote controller operations, the operation screen is easily displayed under conditions of simple operability by the user.

In the aforementioned operation screen display processing, rather than the display controller 151 requesting the detection result from the rotational state detector 14 at certain time intervals, the rotational state detector 14 may generate an event indicating such detection when the rotational state detector 14 detects the rotational state (change of tilt in this case). In this case, upon detection of this event, the display controller 151 acquires the detection result, that is, the rotational state value, detected by the rotational state detector 14.

Further, a configuration may be used that does not use the hook 3 and that attaches the remote controller 1 to a wall, a mount arranged on the wall, or the like by use of a hook-and-loop fastener, a repeatedly detachable-attachable adhesive, or a magnet.

Alternatively, a casing that fits the shape of the remote controller 1 may be arranged on the wall, and the remote controller 1 may be supported by insertion into the casing.

Embodiment 2

Embodiment 2 of the present disclosure is described below. Component elements or the like that are the same in Embodiment 1 are assigned the same reference symbols, and description of such component elements is omitted.

Figure 12:
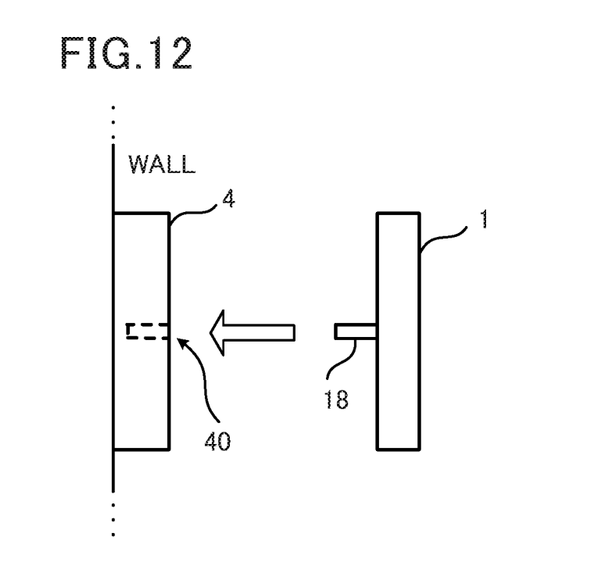
FIG. 12 is a drawing for description concerning support of the remote controller according to an Embodiment 2 of the present disclosure.

The remote controller 1 of the present embodiment is provided with an insertion shaft 18 as illustrated in FIG. 12. Further, a dedicated support stand 4 for support of the remote controller 1 is attached to the wall. The remote controller 1 is axially supported in a rotatable manner by the support stand 4 by the insertion of the insertion shaft 18 into an insertion hole 40 formed in the support stand 4.

Figure 13:
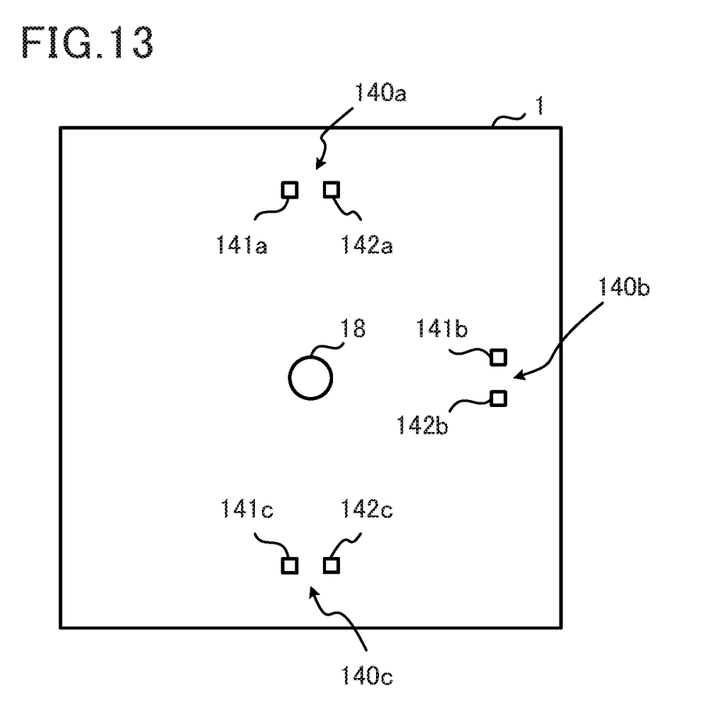
FIG. 13 is a drawing illustrating external appearance (backside) of the remote controller of Embodiment 2.

Although the rotational state detector 14 detecting the rotational state of the remote controller 1 is a tilt sensor in the remote controller 1 of Embodiment 1, and in the remote controller 1 of the present embodiment, includes three switches 140*a*, 140*b*, and 140*c* arranged on the backside of the remote controller 1 as illustrated in FIG. 13. Each of the switches 140*a*, 140*b*, and 140*c* is a normally-open (NO) switch.

The switch 140*a* has terminals 141*a* and 142*a*, and in the same manner as the hook receptacle 10*a* in Embodiment 1, is arranged at the upper portion in the backside of the remote controller 1. The switch 140*b* has terminals 141*b* and 142*b*, and in the same manner as the hook receptacle 10*b*, is arranged at the right side as viewed facing the backside of the remote controller 1. The switch 140*c* has terminals 141*c* and 142*c*, and in the same manner as the hook receptacle 10*c*, is arranged at the bottom side of the backside of the remote controller 1.

Figure 14:
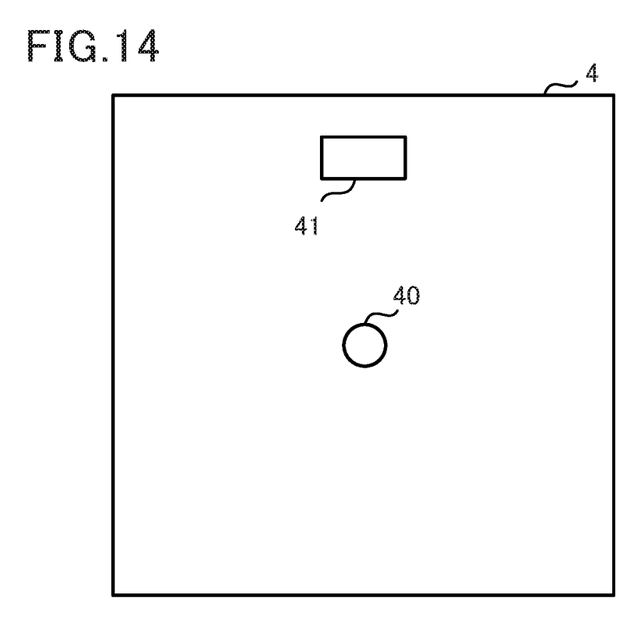
FIG. 14 is a drawing illustrating a surface of a support stand in Embodiment 2.

As illustrated in FIG. 14, a conductor 41 is formed in the surface of the support stand 4. Thus when any one of the switches 140*a*, 140*b*, and 140*c* contacts the conductor 41, the contacted switch 140 is in the closed state.

In the present embodiment in the same manner as in Embodiment 1, there are three different types display modes, that is, the regular mode, the easy-use mode 1, and the easy-use mode 2; and the display mode of the remote controller 1 in the standard position is the regular mode. In the standard position, the mark 17 is disposed on an upper part of the front surface in the state in which the remote controller 1 is axially supported by the support stand 4. In this case, the switch 140a is closed.

At the position rotated by 90° clockwise from the standard position, that is, at the position in which the switch 140b is closed, the display mode is the easy-use mode 1. Further, at the position rotated by 180° clockwise from the standard position, that is, at the position in which the switch 140c is closed, the display mode is the easy-use mode 2.

At certain time intervals, such as every 1 to 2 seconds, the display controller 151 determines whether any of the switches 140a, 140b, and 140c is in the closed state. Then the display controller 151 acquires the rotational angle that corresponds to the switch 140 that is in the closed state. Here, a table indicating correspondence between each switch 140 and the rotational angle is stored beforehand in the data storage 13.

Upon acquisition of the rotational angle, the display controller 151 references the rotational angle versus display mode table 130 and selects the display mode corresponding to the acquired rotational angle. Then the display controller 151 causes the liquid crystal display or the like of the user interface 11 to display the operation screen having content that corresponds to the selected display mode.

In the aforementioned manner, use of the remote controller 1 according to Embodiment 2 of the present disclosure, in the same manner as the remote controller 1 of Embodiment 1, also enables the user to switch the display mode simply by the user rotating the entire remote controller 1, without operating a switch, a GUI button, or the like with which the remote controller 1 is equipped. Thus even if the user is an advanced senior citizen or is unskillful in remote controller operations, the operation screen is easily displayed under conditions of simple operability by the user.

A casing that fits the shape of the remote controller 1 may be arranged on the support stand 4, without arrangement of the insertion shaft 18 on the remote controller 1, and the remote controller 1 may be supported by insertion into this casing.

The present disclosure is not limited to the various aforementioned embodiments, and naturally various types of modifications are possible within a scope that does not depart from the gist of the present disclosure.

For example, although the communication between the remote controller 1 and the air conditioner 2 is performed wirelessly in each of the aforementioned embodiments, a configuration may be used in which the remote controller 1 and the air conditioner 2 are connected via a communication line to mutually communicate via wired communication.

Further, the device that is the subject of control by the remote controller 1 is not limited to the air conditioner, and this device may be a lighting device or various other types of home electric devices or facility equipment.

Further, a configuration may be used in which multiple devices are controlled by the remote controller 1. In this case, a configuration may be used in which the devices simultaneously undergo the same control, and a configuration may be used that enables selection of the control target as an individual device unit or a group of device units. Further, different types of devices can be included, such as an air conditioner, a lighting device, or the like.

Further, the number of types of display mode is not limited, and the number of types of display mode may be 2 or may be at least 4.

Further, the correspondence between the rotational angle and the display mode is a freely-selected matter of design, and for example, a configuration may be used in which the display mode changes for every 45° of clockwise rotation from the standard position. Further, a configuration may be used in which the rotational angle versus display mode table 130 is appropriately editable by the user via the user interface 11.

Further, a configuration may be used in which the external appearance of the remote controller 1, that is, the front surface and the backside, is circular or is shaped like a polygon having at least 5 corners, rather than rectangle-shaped.

Further, magnitude of brightness or magnitude of contrast may change in accordance with the display mode. In this case, the brightness and/or the contrast of the operation screen of the easy-use mode 1 is increased relative to the brightness and/or contrast in the operation screen of the regular mode, and the brightness and/or the contrast of the operation screen of the easy-use mode 2 is increased relative to the brightness and/or contrast in the operation screen of the easy-use mode 1.

Further, a configuration may be used in which the remote controller 1 includes a notifier to output voice or electronic sound such as a beep to notify the user when the display mode changes. Further, during such notification, the notifier may output the notification in accordance with the type of the display mode by changing pitch of sound, an output time interval, an output time span, message content, or the like.

Further, in the same manner as in Embodiment 2, the insertion shaft 18 may be arranged in the remote controller 1 of Embodiment 1 (see FIG. 12), and a configuration may be used in which the remote controller 1 is rotatably axially supported by the support stand 4 arranged at the wall.

When a configuration is used in which the remote controller 1 is rotatably axially supported by the support stand 4 in the aforementioned manner, the remote controller 1 may include a latch mechanism so that the remote controller 1 becomes semi-fixed (semi-locked) at specific rotation positions. In this case, a configuration may be used in which the semi-fixed (semi-locked) state of the remote controller 1 occurs, for example, at the standard position, and the position rotated 90° clockwise from the standard position (that is, at the position rotated 270° counterclockwise), and at the position rotated 180° clockwise or counterclockwise from the standard position.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL AVAILABILITY

The present disclosure is capable of use with advantage for a remote controller for operation of a home electric device, facility equipment, or the like.

REFERENCE SIGNS LIST

1 Remote controller
2 Air conditioner
3 Hook
4 Support stand
10a, 10b, 10c Hook receptacle 11 User interface
12 Communicator
13 Data storage
14 Rotational state detector
15 Controller
16 Bus
17 Mark
18 Insertion shaft
40 Insertion hole
41 Conductor
130 Rotational angle versus display mode table
140a, 140b, 140c Switch
141a, 141b, 141c, 142a, 142b, 142c Terminal
150 Device controller
151 Display controller

The invention claimed is:

1. A remote controller for controlling at least one device, the remote controller comprising:
   a display configured to display an operation screen;
   a rotational state detector configured to detect a rotational state of the remote controller; and
   a display controller configured to select, based on the detected rotational state, a display mode from among a plurality of display modes predetermined depending on different user tiers, and cause the display to display the operation screen in the selected display mode,
   wherein the plurality of display modes includes a regular mode for display of an operation screen targeting a general user, and an easy-use mode for display of an operation screen targeting a user more unskillful in remote controller operations than the general user.

2. The remote controller according to claim 1, further comprising a table associating each display mode of the plurality of display modes with a rotational angle of the remote controller,
   wherein the display controller is configured to acquire, the rotational angle, based on the rotational state detected by the rotational state detector, and by referencing based on the acquired rotational angle the table, select a display mode from among the plurality of display modes.

3. The remote controller according to claim 1, wherein the rotational state detector comprises a tilt sensor configured to detect a tilt.

4. The remote controller according to claim 1, further comprising a notifier configured to output sound to notify a user when the display mode changes.

5. An operation screen display method executed by a remote controller for controlling at least one device, the operation screen display method comprising:
   detecting a rotational state of the remote controller;
   selecting, based on the detected rotational state, a display mode from among a plurality of display modes predetermined depending on different user tiers; and
   displaying an operation screen in the selected display mode,
   wherein the plurality of display modes includes a regular mode for display of an operation screen targeting a general user, and an easy-use mode for display of an operation screen targeting a user more unskillful in remote controller operations than the general user.

6. A non-transitory computer-readable recording medium storing a program for causing a remote controller, for controlling at least one device, to function as:
   a display controller configured to:
      acquire a rotational state of the remote controller from a rotational state detector that is configured to detect the rotational state;
      select, based on the acquired rotational state, a display mode from among a plurality of display modes predetermined depending on different user tiers; and
      cause a display to display an operation screen in the selected display mode,
   wherein the plurality of display modes includes a regular mode for display of an operation screen targeting a general user, and an easy-use mode for display of an operation screen targeting a user more unskillful in remote controller operations than the general user.

7. A remote controller for controlling at least one device, the remote controller comprising:
   a display configured to display an operation screen;
   a rotational state detector that comprises a plurality of switches and is configured to detect a rotational state of the remote controller, each switch of the plurality of switches being closed when coming into contact with a conductor; and
   a display controller configured to select, based on the detected rotational state, a display mode from among a plurality of display modes predetermined depending on different user tiers, and cause the display to display the operation screen in the selected display mode.

* * * * *